United States Patent [19]

Papania

[11] Patent Number: 5,651,438
[45] Date of Patent: Jul. 29, 1997

[54] ROLLER CLUTCH HAVING INTERLOCKING CAGE SEGMENTS

[75] Inventor: James R. Papania, Bolingbrook, Ill.

[73] Assignee: Borg-Warner Automotive, Inc., Sterling Heights, Mich.

[21] Appl. No.: 490,800

[22] Filed: Jun. 15, 1995

[51] Int. Cl.⁶ .......................... F16D 41/067; F16D 15/00
[52] U.S. Cl. .......................... 192/45; 29/434; 29/898.064; 384/578
[58] Field of Search .................. 192/38, 45; 384/523, 384/560, 576, 578, 572; 29/451, 898.067, 898.061, 898.064, 434

[56] References Cited

U.S. PATENT DOCUMENTS

| | | | |
|---|---|---|---|
| 4,054,192 | 10/1977 | Johnson | 192/45 |
| 4,239,304 | 12/1980 | Wakunami | |
| 4,397,507 | 8/1983 | Kraus et al. | |
| 4,555,002 | 11/1985 | Baker | 192/45 |
| 4,679,676 | 7/1987 | King et al. | 192/45 |
| 4,724,940 | 2/1988 | Lederman | 192/45 |
| 4,821,856 | 4/1989 | Lederman | 192/45 |
| 4,834,227 | 5/1989 | Lederman | 192/45 |
| 4,844,628 | 7/1989 | Knappe | 384/523 X |
| 4,901,834 | 2/1990 | Lederman | 192/45 |
| 4,987,670 | 1/1991 | Papania | 29/451 |
| 5,273,144 | 12/1993 | Papania | 192/45 |
| 5,535,866 | 7/1996 | Joppeck | 192/45 |

OTHER PUBLICATIONS

Copy of the European Search Report dated Oct. 8, 1996 in EP 96304107.4 corresponding to U.S. Ser. No. 08/490,800.

*Primary Examiner*—Rodney H. Bonck
*Attorney, Agent, or Firm*—Emch, Schaffer, Schaub et al.; Greg Dziegielewski

[57] ABSTRACT

A cage segment for use in a clutch having a cam race and a pathway race. The cage segment has at least one engaging member which engages a receiving member on an adjacent cage segment. The cage segment is secured to the adjacent cage segment in the radial, axial and circumferential directions.

21 Claims, 2 Drawing Sheets

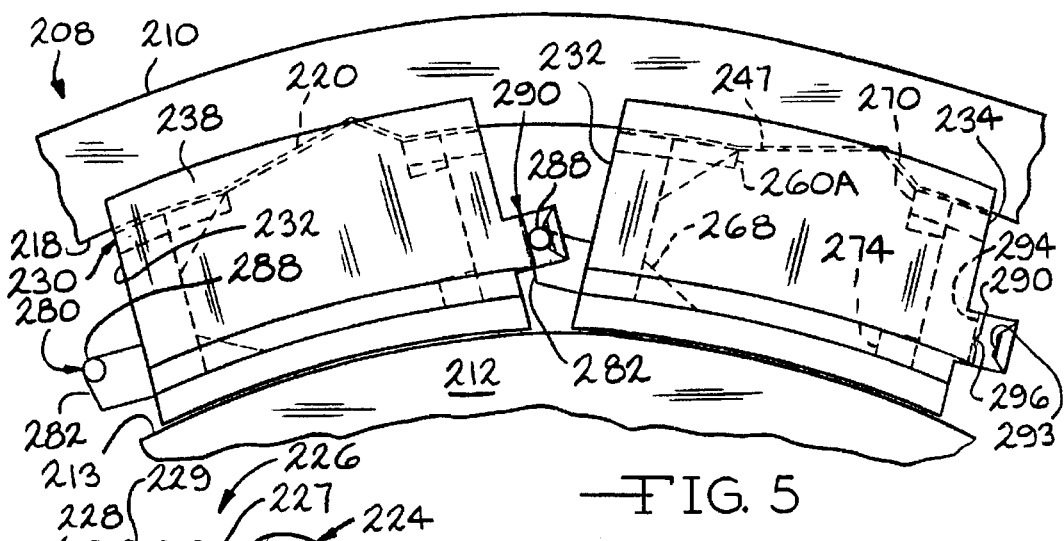
FIG. 5
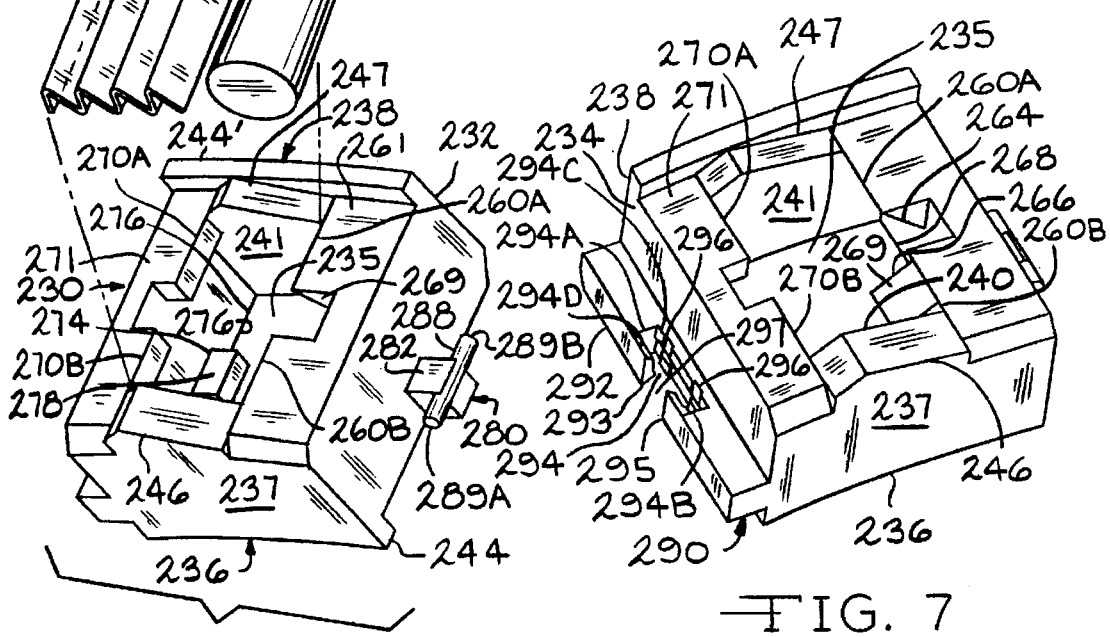
FIG. 6
FIG. 7

5,651,438

ROLLER CLUTCH HAVING INTERLOCKING CAGE SEGMENTS

TECHNICAL FIELD

This invention relates to roller clutches in general and specifically to interlocking cage segments for use in roller clutches which provide secure cage segments in the radial, axial and circumferential directions. The interlocking segments also provide a roller clutch with a simplified assembly and installation.

BACKGROUND ART

Many automotive transmissions use overrunning roller clutches to provide selective relative directional rotation between a driving member and a driven member. The overrunning roller clutches usually comprise a plurality of rollers retained in a roller cage or clutch cage which is positioned between an inner and outer race. The rollers contained in the clutch cage will effectively engage the races, depending on the direction of rotation. Different types of clutch cages have been utilized in such transmissions. One-piece clutch cages are integrally molded and adapted to be installed as a singular unit in an annular space between the races. Other clutch cages are comprised of a series of segments which are assembled and installed in the annular space between the races.

With both types of clutch cages it is important to insure that the inner and outer race are maintained in a coaxial relationship. While most clutch cages are designed to have bearing portions which act to maintain the races in this coaxial position there is a tendency for the races to shift or skew thereby moving one or the other race out of coaxial alignment. One-piece cages have been designed to overcome this problem of non-coaxial alignment. The installation of the one-piece cages into the space located between the inner and outer race, however, requires a fairly substantial simultaneous torque and thrust load, which presents ergonomic problems since one-piece cages are not perfectly round and therefore require high torque during assembly.

Most one-piece cages are now being designed to have at least one expansion joint to allow the cage to expand and contract as a result of temperature fluctuation, moisture absorption, and cooling effects resulting from operation of the transmission.

One-piece cages which have incorporated such expansion joints elastically deform during the heat cycles of the automatic transmission. However, it has been experienced that the cage expansion joints also plastically deform, thereby causing operational interference and increased frictional wear.

In cages which are comprised of discontinuous or segmented cage members, connector means are necessarily located on each segment for adjoining the adjacent cage segments. One type of clutch cage system having segmented cage members is described in U.S. Pat. No. 4,054,192, issued to Johnson which comprises a number of engaged plastic segments which fit together between the races. However, while Johnson meets the objective of holding the cages centered between the races, the individual segments have an undesirable tendency to move or dislodge in the radial, axial and/or circumferential directions.

The present invention eliminates the problems particular to the above described prior art and provides segmented cages that are securely connected to an adjoining segment.

It is, therefore, an object of the present invention to provide an improved clutch wherein a plurality of interlocking cage segments are securely engaged with each other in three directions: axially, radially and circumferentially.

It is another object of the present invention to provide an improved method for installing segmented cages into a clutch assembly by providing at least one engaging means and at least one retaining means on the segmented cage so that the interlocking segments are automatically secured in the circumferential direction. In one embodiment the segments are interlocked to form a cage using a bi-directional axial assembly method. In another embodiment the segments are interlocked to form a cage using a unidirectional radial assembly method.

DISCLOSURE OF THE INVENTION

The present invention provides an improved roller clutch having camming race and pathway race. A plurality of individual locking segments forming a cage are installed in an annular space defined between the races. The cage segments maintain a fixed distance between the races relative to the axis of the races. The camming race defines a plurality of cam surfaces which are circumferentially disposed along one surface of the cam race. Individual cage segments are disposed adjacent each cam surface of the cam race. Each cage segment member includes a camming surface which contacts the adjacent cam surface of the cam race during clutch operation.

A plurality of rollers and resilient means are also disposed between the races. A roller and resilient means, which may comprise, for example, a pleated, accordion-styled of spring or a wire spring, are positioned within an interior space defined by each of the cage segments. The rollers, retained in the individual cage segments between the races, move in a circumferential direction between the races during clutch operation.

The cage segments including their respective rollers and springs are positioned in the annular space between the races. Each cage segment includes an engaging means which connects with or engages a corresponding receiving means on an adjacent cage segment. In preferred embodiments, the engaging means comprises at least one tab or latching mechanism that locks or snaps into the receiving means on the adjacent cage segment. The interlocking cage segments are then restrained from disengagement, in the radial, axial and circumferential directions, between the adjacent cage segments and from the cam race. Also, in preferred embodiments, each cage segment includes at least one retaining means for holding the cage segment in proper axial alignment against the outer axial surfaces of the outer race and inner race.

The individual cage segment of the present invention is generally designed to include two side walls in opposed parallel relationship and two end walls in opposed parallel relationship, thereby defining the annular space between the opposed side walls and the opposed end walls. The end walls are preferably formed as solid end pieces. The solid end walls utilize 100% more annular volume as compared to prior art one-piece cages. Further, the end walls provide for enhanced control of the roller and spring, thereby assisting in the prevention of misalignment or roller skew, both during assembly of the clutch and during use of the clutch.

The roller and spring are securely retained by their respective cage segment within the annular space between the races. The rollers ride or travel circumferentially along a smooth inner surface located on the inner race. During any change in direction of relative rotation of the cam race with respect to the pathway race, the roller is retained in a secure circumferential, radial and axial position such that substantially the entire longitudinal surface of the roller engages the inner surface of the inner race. That is, the roller is prevented from skewing and a smooth transition or shift occurs.

Another feature of the present invention provides that one end wall of the cage segment defines the engaging means and the opposed end wall defines the retaining means. The engaging means of one cage segment is linked or interlocked with the retaining means of an adjacent cage segment.

Still another feature of the present invention is that the end walls of the cage segment aid in retaining lubrication materials in the areas where such lubrication is most needed. The cage segments are designed to create a barrier to funnel lubrication out of the cam race and toward the friction pack of the clutch.

Another feature of the invention provides that portions of the side walls form a retaining means or latching mechanism for engaging the cam race and/or the pathway race to retain the cage segments in axial alignment in the clutch.

The present invention provides greatly reduced cost of production for roller clutches as the individual cage segments can be automatically assembled into a linked cage.

The above features and other objects, features and advantages of the invention will become more apparent from the following description taken in conjunction with the accompanying drawings.

BRIEF DESCRIPTION OF THE DRAWINGS

FIG. 5 is a side elevational view, partially in phantom, of a second embodiment of the invention showing two cage segments operatively connected or linked together.

FIG. 6 is a perspective view of a second embodiment of the cage segment shown in FIG. 5 showing one end of the cage segment in detail.

FIG. 7 is a perspective view of the cage segment shown in FIG. 6 showing the opposed end of the cage segment in detail.

BEST MODE FOR CARRYING OUT THE INVENTION

Figure 1:
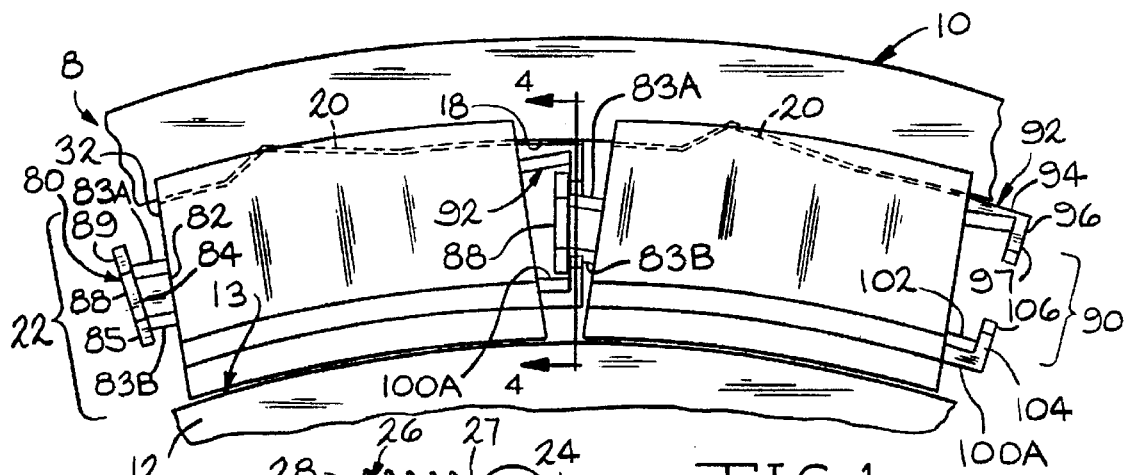
FIG. 1 is a side elevational view, partially in phantom, of one embodiment of the invention showing two cage segments operatively connected or linked together.

A clutch 8 and a pair of races including an outer cam race 10 and an inner smooth cylindrical pathway race 12 are shown in part in FIG. 1. For ease of illustration the outer race is shown as the cam race and the inner race is shown as the pathway race. However, it should be understood that either the outer race or the inner race can define the camming surface or the pathway surface as will be described in detail below.

A plurality of cage segments generally shown as 30 are positioned between the races 10 and 12. In preferred embodiments the cage segments 30 are molded of a suitable plastic or metal material which has desirable strength and frictional characteristics. The cage segments 30 of the present invention are easier to mold into a suitable shape and provide more cost benefits both in production and in shipping than that of currently available cages. According to the present invention, the individual segments can be formed having optimum dimensions of thickness, width and length, and to provide optimum flexibility of the cage segments. As shown, the cage segments 30 are slightly arcuate in elevation such that each cage segment 30 fits within an arcuate annular space defined by the cam and pathway races 10 and 12, respectively. Each cage segment 30 is in a connected or interlocked relationship with an adjacent cage segment.

A cammed surface 18 on the cam race 10 and a substantially smooth circumferentially extending inner surface 13 on the pathway race 12 define the annular space 22.

The annular space 22 receives the segment 30 which has at least one roller 24 and at least one resilient means 26 such as a spring positioned within the segment 30. The roller 24 is biased in one direction by the spring 26.

During operation of the clutch both the cam race 10 and pathway race 12 rotate in the same direction. The spring 26 holds the roller 24 in an operating position such that the roller 24 contacts the inner surface 13 of the pathway race 12. During the operation of the clutch the roller 24 moves or rotates in a direction toward the spring 26 thereby compressing the spring 26. It is commonly noted that the cam race 10 and pathway race 12, while rotating in the same direction, do not always maintain relative equidistant axial positions. Rather, the annular space 22 defined by the cammed surface 18 of the cam race 10 and the inner surface 13 of the pathway race 12 may vary in radial thickness at any given circumferential location with each rotation of the races 10 and 12.

Figures 2, 3:
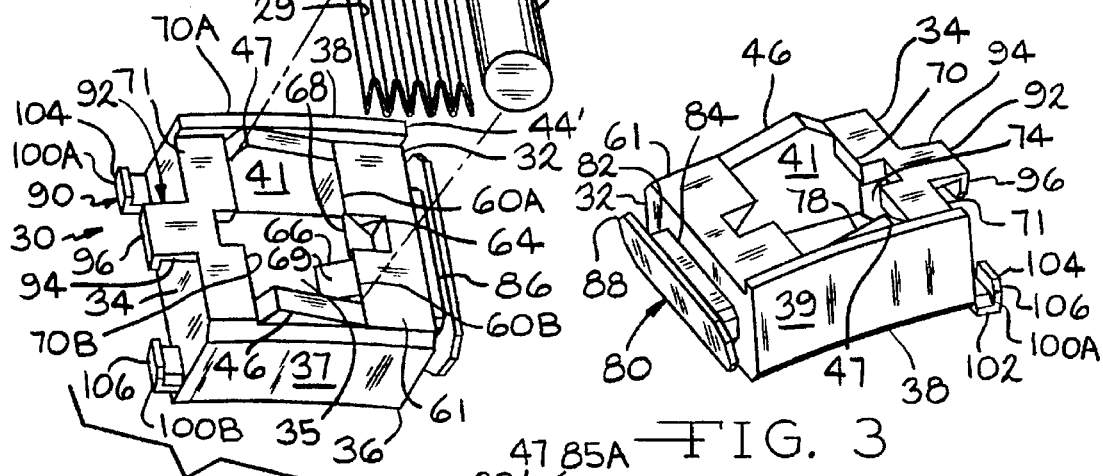
FIG. 2 is a perspective view of a first embodiment of the cage segment shown in FIG. 1 showing one end of the cage segment in detail.
FIG. 3 is a perspective view of the cage segment shown in FIG. 2 showing the opposed end of the cage segment in detail.

Referring now to FIGS. 1–4 in particular, one embodiment of the cage segment 30 of the present invention is shown in detail. The segment 30 comprises a first end 32 and a second end 34 which are in an opposed and parallel relationship and a first side wall 36 and a second side wall 38 which are likewise in an opposed and parallel relationship. The ends 32 and 34 and side walls 36 and 38 define an interior space 35 which, in preferred embodiments, is substantially rectangular or square in shape. Each side wall 36 and 38 has an outer wall surface 37 and 39, respectively, as shown in FIGS. 2 and 3. Each side wall 36 and 38 also has an inner wall surface 40 and 41, respectively.

Each inner surface 40 and 41 of each side wall 36 and 38 further define a reaction ear or camming surface 46 and 47, respectively. In operation, the camming surfaces 46 and 47 slideably or matingly engage the sloped cam ramp 20 of the cam race 10 and provide a great improvement in the reaction capacity of the present invention over prior art clutch cages. In addition, the inner surfaces 40 and 41 of each side wall 36 and 38 assist in retaining the roller 24 in position such that any propensity for roller skew during operation of the clutch is diminished.

Figure 4:
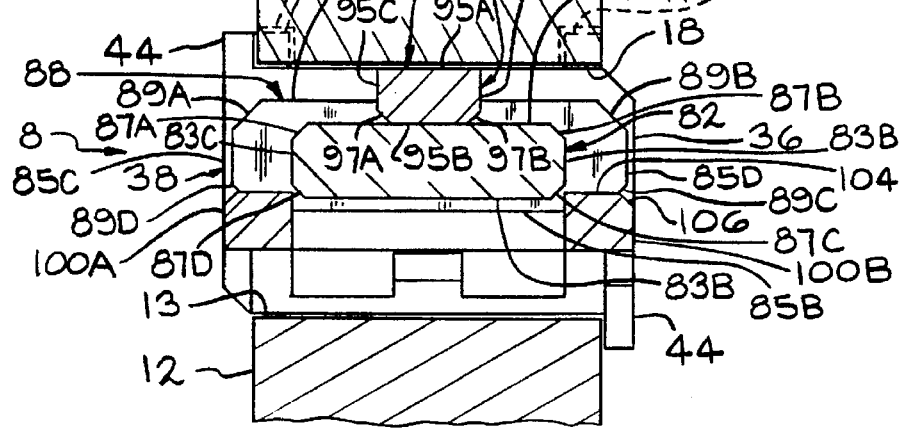
FIG. 4 is a view taken substantially along the line 4—4 in FIG. 1.

Each of the side walls 36 and 38 has at least one retaining means 44 and 44' which extend radially from the side walls 36 and 38, respectively as best seen in FIG. 4. It is to be understood that various shaped retaining means 44 are useful in the present invention. Thus, the retaining means 44 on the side wall 36 extends radially inwardly in a direction toward engagement with the inner race 12. The retaining means 44' on the side wall 38 radially extends outwardly in a direction toward engagement with the outer race 10.

In the embodiment shown the retaining means 44 and 44' comprise circumferentially extending tabs which substantially extend from the first end 32 to the second end 34 of the cage segment 30. The retaining means provide a great improvement in axial retention capacity of the present invention over prior art clutch cages. It is to be understood that other retaining means for receiving and securing the individual cage segments between the races are within the contemplated scope of the present invention and, that for ease of illustration of the present invention only, the retaining means generally depicted as circumferentially extending tabs are shown. It is further to be understood that the retaining means can comprise tabs which only partially extend circumferentially from the first end to the second end of the segment such that the tabs have a discontinuous arcuate shape. Also contemplated are retaining means which protrude from the cage segment in a direction toward an opposing side wall and secure the cage segment onto the races by contacting at least one indented groove or detent shape located on one or both of the races (not shown).

In the embodiment shown in FIGS. 1–4, the first end 32 of the segment 30 defines one or more upper flanges 60 which circumferentially extend inwardly toward the second end 34. In the embodiment shown, the first end 32 comprises flanges 60A and 60B which extend from a top portion 61 of the first end 32. The flanges 60A and 60B can have a wedge-shaped or sloped surface 64. In the embodiment shown, the first end 32 defines at least one lower flange 66 which also circumferentially extends inwardly toward the second end 34 from a lower portion 68 of the first end 32. The flange 66 can also have a wedge-shaped or sloped surface 69. The upper flanges 60A and 60B and the lower flange 66 engage and retain the roller 24. The roller 24 is resiliently pressed between the upper flanges 60A and 60B and the lower flange 66 by the spring 26. The roller 24 is thus engaged and retained between the flanges 60 and 66 prior to installation of the segment 30 in the clutch. However, it is to be understood that other embodiments of the cage segment of the present invention can be formed without utilizing such upper and lower flanges 60 and 66, while designing the spring 26 to hold and retain the roller 24 within the cage segment 30.

The second end 34 of the segment 30 defines at least one or more upper flanges 70 which circumferentially extend toward the first end 32. In the embodiment shown, the second end 34 comprises flanges 70A and 70B which are in a spaced apart relationship and which circumferentially extend from a top portion 71 of the second end 34 toward the first end 32. The second end 34 further defines at least one lower flange 74 which circumferentially extends inwardly toward the first end 32 from a lower portion 76 of the second end 34. The upper flanges 70A and 70B and the lower flange 74 engage and retain the spring 26 within the cage segment 30. In the embodiment shown, the lower flange 74 has a sloped upper surface 78. The sloped surface 78 of the lower flange 74 acts to bias at least one edge 29 of the spring 26 in a direction toward the upper flanges 70A and 70B. Thus the spring 26 is held in position in the segment 30 by having its first end 27 engage the roller 24 and its second end 28 engage the upper flanges 70 and lower flange 74.

In the embodiment shown in FIGS. 1–4, an engaging means 80 is operatively connected to the first end 32 of the cage segment 30. Preferably, the engaging means 80 is integrally formed with the first end 32. The engaging means 80 has a first portion 82 having a first end 84 operatively connected to the first end 32. The first portion 82 has a second end 86 which is operatively connected to a second portion 88 of the engaging means 80. The second portion 88 generally forms the cross piece of a "T" shape. In the embodiment shown, the first and second portions 82 and 88 each have a generally square or rectangular shape. However, it is to be understood that the first and second portions 82 and 88 can have other shapes. In the embodiment shown in FIGS. 1–4, the first and second portions 82 and 88 have a plurality of angled or clipped corner portions 87A–D and 89A–D, respectively, which aid in retaining the engaging means 80 within a receiving means 90 of an adjacent cage segment, as will be described in detail below. Thus, in the embodiment shown in FIG. 4, the planar surfaces of the first portion 82 actually has eight sides: an upper axially extending side 83A and a lower axially extending side 83B, an inner radially extending side 83C, an outer radially extending side 83D, and four angled sides 87A, 87B, 87C and 87D. Each angled side 87A, 87B, 87C and 87D extends from one axially extending side to the adjacent radially extending side. For example, angled side 87A extends between axially extending side 83A and outer side 83D.

The planar surfaces of the second portion 88 actually has eight sides: an upper axially extending side 85A, a lower axially extending side 85B, an inner radially extending side 85C, an outer radially extending side 85D and four angled sides 89A, 89B, 89C and 89D. Each of the angled sides 89A, 89B, 89C and 89D extends from one axially extending side to the adjacent radially extending side. For example, angled side 89A extends between axially extending side 85A and outer side 85D.

In various embodiments, it is desired to have the upper face 83A circumferentially extend from the first end 32 farther than the lower face 83B such that the second portion 88 is positioned at an angle relative to the surface of the first end 32. This angling of the second portion 88 allows the adjacent cage segments 30 to be aligned in closer proximity than if the upper face 83A and lower face 83B had the same length. Again, however, it is to be understood that the second portion 88 need not be placed at an angle with respect to the first end 32.

The second end 34 of the cage segment 30 defines the receiving means 90. Preferably, the receiving means 90 is integrally formed with the second end 34. In the embodiment shown in FIGS. 1–4, the receiving means 90 comprises at least one upper extending flange 92 which has a first portion 94 which extends circumferentially from the second end 34. The upper flange 92 further has a second portion 96 which depends or radially extends inwardly from a distal end of the first portion 94. In the embodiment shown, the radially extending second portion 96 has a planar surface which defines angled or clipped corners 97. Thus, the planar surface of the flange 92 has six sides. The two axially (one upper and one lower) axially extending sides are 95A and 95B. The two (one inner and one outer) radially extending sides are an inner side 95C and an outer side 95D. The angled sides are 97A and 97B. Each angled side 97A and 97B extends from the lower axially extending side 95B to the side 97C and outer side 97D, respectively. However, it should be also understood that the second portion 96 can have a generally rectangular or square shape.

The receiving means 90 further defines at least one lower flange 100. In the embodiments shown in FIGS. 1–4, the cage segment 30 has a first lower flange 100A which is in a spaced apart relationship from a second lower flange 100B. Each lower flange 100A and 100B has a first portion 102 which extends circumferentially from the second end 34 and a second portion 104 which depends or extends in a radially outward direction from a distal end of the first portion 102 toward the upper flange 92. In the embodiment shown the radially extending second portion 104 has a planar surface which defines an angled corner 106 on an outside or exterior portion of the second portion 104 of the lower flange 100. However, it is to be understood that the lower flanges 100 can have second portions 100 with a substantially rectangular or square shape.

Assembly of the clutch comprises placing the roller 24 and the spring 26 within the interior space 35 of the segment 30. In certain embodiments where upper flanges 60A and 60B and lower flange 66 are present, the roller 24 is positioned against the upper flanges 60A and 60B and lower flange 66. The spring 26 is then compressibly positioned against the upper flanges 70A and 70B and lower flange 74 and against the longitudinal surface of the roller 24.

Thereafter, each assembled segment 30, having the spring 24 and the roller 26 positioned therein, is moved into position adjacent the cam race 10 by aligning the camming surfaces 46 and 47 of the segment 30 with an adjacent sloped cam ramp 20 of the cam race 10. In the embodiments shown in FIGS. 1–4, the engaging means of one cage segment and the receiving means of the adjacent cage segment allow for bi-directional axial assembly. The embodiments shown in FIGS. 1–4 provide a great increase in the radial strength of the cage.

The cage segment 30 is moved in an axial direction toward an adjacent segment 30 (as seen in FIG. 1) such that the engaging means 80 on the first cage segment contacts the receiving means 90 on the adjacent cage segment. The engaging means 80 is axially moved toward the receiving means 90 until the engaging means 80 is in contact with (or snapped into) the receiving means 90. The first portion 82 of the engaging means 80 contacts the corner 97 of the upper flange 92 and lower flanges 100A or 100B. As the one cage segment is moved axially in a direction toward engagement with the other cage segment, the first portion 82 pushes against or is moved against the upper flange 92 and the lower flanges 100A or 100B such that at least one of these flanges flexes in a radially outward direction (in the case of the upper flange 92) or in a radially inwardly direction (in the case of lower flanges 100A and 100B). The first portion 82 contacts the second portion 96 of the upper flange 92 and the second portions 104 of the lower flanges 100A and 100B. Thereafter, the second upper portion 88 of the engaging means 80 is engaged on its back surface by the upper flange 92 and lower flanges 100A and 100B. As best seen in FIG. 4, the upper flange 92 and lower flanges 100A and 100B retain the second portion 88 securely within the space between the second portion 92 of the upper flange 90 and the second portions 106 of the lower flanges 100A and 100B.

According to the present invention, the cage segments 30 can be automatically installed in the clutch. When the segment 30 is snapped into the adjacent segment 30 and is positioned adjacent a corresponding sloped cam surface 20 of the cam race 10 the roller 24 moves in a direction toward the spring 26 such that the spring 26 is compressed.

The cage segment 30 is held in circumferential retention due to the contact between the second portion 88 of the engaging means 80 and the second portion 96 of the upper flange 92 and the second portion 106 of the lower flanges 100. The cage segment 30 is also held in circumferential retention due to the contact of the camming surfaces 46 and 47 of the cage segment 30 against the sloped cam ramp 20 of the cam race 10.

The segment 30 is held in radial retention due to the contact of the camming surfaces 46 and 47 of the cage segment 30 against the sloped cam ramp 20 of the cam race 10 and due to the contact of the first portion 82 with the first portion 94 of the upper flange 92 and the first portions 102 of the lower flanges 100.

The cage segment 30 is held in axial retention due to the contact between the second portions 106 of the flanges 100 with the lower clipped corners 87C and 87D of the first portion 82 of the engaging means 80. As best seen in FIG. 4, the second portions 106 stop any axial movement by coming into contact with the lower clipped corners 87 of the first portion 82.

The segment 30 is also held in axial retention due to the engagement of the engaging means 44 and 44' with the cam race 10.

In addition, the side walls 34 and 36 of the segment 30 hold the spring 26 and steel roller 24 in axial retention.

The cage segments 30 are secured together to form a substantially circular interlocked or snapped together cage. The snapped together cage is installed adjacent the cam race 10 and the pathway race 12 is to form the clutch 8.

Referring now to FIGS. 5–7, a further embodiment of a clutch 208 is shown wherein a plurality of cage segments generally shown as 230 are positioned between an outer cam race 210 and an inner smooth cylindrical pathway race 212. For ease of illustration, the outer race is shown as a cam race and the inner race is shown as the pathway race. However, it should be understood that either the outer race or the inner race can define the camming surface or the pathway surface, as will be described in detail below.

In preferred embodiments the cage segments 230 are molded of a suitable plastic or metal-type material which has desired strength and frictional characteristics. The cage segments of the present invention are easier to mold into a suitable shape and provide more cost benefits both in production and shipping than that of currently available cages. According to the present invention, the individual cage segments can be formed having optimum dimensions of thickness, width and length and to provide optimum flexibility of the cage segments. As shown, the cage segments 230 are slightly arcuate in elevation such that each cage segment 230 fits within an annular arcuate space defined by the cam and pathway races 210 and 212, respectively. Each cage segment 230 is in a connected or interlocked relationship with an adjacent cage segment. A cammed surface 218 on the cam race 210 and a substantially smooth circumferentially smooth circumferentially extending inner surface 213 on the pathway race 212 define the annular space 222. The annular space 222 receives the cage segment 230 which has at least one roller 224 and at least one resilient means 226, such as a spring, positioned within the segment 230. The roller 224 is biased in one direction by the spring 226.

During the operation of the clutch 208 both the cam race 210 and the pathway race 212 rotate in the same direction. The spring 226 holds the roller 224 in an operating position such that the roller 224 contacts the inner surface 213 of the pathway race 212. During operation of the clutch, the roller 224 moves or rotates in a direction toward the spring 226, thereby compressing the spring 226. It is commonly noted that the cam race 210 and the pathway race 212, while rotating in the same direction, do not always maintain relative equidistant axial positions. Rather, the annular space defined by the cammed surface 218 of the cam race 210 and the inner surface 213 of the pathway race 212 may vary in radial thickness at any given circumferential location with each rotation of the races 210 and 212.

Referring now specifically to FIGS. 5–7, the segment 230 comprises a first end 232 and a second end 234 which are in an opposed and parallel relationship and a first side wall 236 and a second side wall 238 which are likewise in an opposed and parallel relationship. The ends 232 and 234 and side walls 236 and 238 define an interior space 235 which, in preferred embodiments, is substantially rectangular or square in shape. Each side wall 236 and 238 has an outer surface 237 and 239, respectively. Each side wall 236 and 238 also has an inner wall surface 240 and 241, respectively.

Each inner surface 240 and 241 of each side wall 236 and 238 further define a reaction ear or camming surface 246 and 247, respectively. In operation the camming surfaces 246 and 247 slidingly or matingly engage the sloped cam ramp 220 of the cam race 210 and provide a great improvement in the reaction capacity of the present invention over prior art clutch cages. In addition, the inner surfaces 240 and 241 of each side wall 236 and 238 assist in retaining the roller 224 in position such that any propensity for roller skew during operation of the clutch is diminished.

Each of the side walls 236 and 238 has at least one retaining means 244 and 244' which extend radially from the side walls 236 and 238. It is to be understood that various shaped retaining means 244 and 244' are useful in the present invention. Thus, the retaining means 244 on the side wall 236 extends radially inwardly in a direction toward engagement with the inner race 212. The retaining means 244' on the side wall 238 extends radially outward in a direction toward engagement with the outer race 210.

In the embodiment shown, the retaining means 244 and 244' comprise circumferentially extending tabs which substantially extend from the first end 232 to the second end 234 of the cage segment 230. The retaining means provide a great improvement of the present invention in the axial retention capacity over prior art clutch cages. It is to be understood that other retaining means for receiving and securing the individual cage segments between the races are within the contemplated scope of the present invention and that for ease of illustration of the present invention only the retaining means generally depicted as circumferentially extending tabs are shown. It is further to be understood that retaining means can comprise tabs which only partially extend circumferentially from the first end to the second end of the segment such that the tabs have a discontinuous arcuate shape. Also contemplated are retaining means which protrude from the cage segment toward an opposing side wall and secure the cage segment onto the races by contacting at least one indented groove or detent shape located on one or both of the races (not shown).

In the embodiment shown in FIGS. 5–7, the first end 232 of the segment 230 defines one or more upper flanges 260 which circumferentially extend inwardly toward the second end 234. In the embodiment shown, the first end 232 comprises flanges 260A and 260B which extend from a top portion 261 of the first end 232. The flanges 260A and 260B can have a wedge-shaped or sloped surface 264. In the embodiment shown, the first end 232 defines at least one lower flange 266 which circumferentially extends inwardly toward the second end 234 from a lower portion 268 of the first end 232. The flange 266 can also have a wedge-shaped or sloped surface 269. The upper flanges 260A and 260B and the lower flange 266 engage and retain the roller 224. The roller is resiliently pressed between the upper flanges 260A and 260B and the lower flange 266 by the spring 226. The roller 224 is thus engaged and retained between the flanges 260A and 260B and flange 266 prior to installation of the segment 230 in the clutch. However, it is to be understood that other embodiments of the cage segment of the present invention can be formed without utilizing such upper and lower flanges 260 and 266 while designing the spring 226 to hold and retain the roller 224 within the cage segment 230.

The second end 234 of the segment 230 defines at least one or more upper flanges 270 which circumferentially extend toward the first end 232. In the embodiment shown, the second end 234 comprises flanges 270A and 270B which are in a spaced apart relationship and which circumferentially extend from a top portion 271 of the second end 234 toward the first end 232. The second end 234 further defines at least one lower flange 274 which extends inwardly toward the first end 232 from a lower portion 276 of the second end 234. The upper flanges 270A and 270B and the lower flange 274 engage and retain the spring 226 within the cage segment 230. In the embodiment shown, the lower flange 274 has a substantially flat upper surface 278 or can have a sloped upper surface (not shown). The surface 278 of the flange 274 acts to bias at least one edge 229 of the spring 226 in a direction toward the upper flanges 270A and 270B. Thus, the spring 226 is held in position in the segment 230 by having its first end 227 engage the roller 224 and its second end 228 engage the upper flanges 270 and lower flange 274.

The first end 232 has an engaging means 280 which extends in a circumferential direction away from the first end 232. Preferably the engaging mean 280 is integrally formed with the first end 232. The engaging means 280 comprises first portion 282 operatively connected to the first end 232 and a second portion 288 operatively connected to the first portion 282 and which extends in a radial direction. In the embodiment shown in FIGS. 5–7, the second portion 288 has a substantially cylindrical shape having opposing ends 289A and 289B. However, it is to be understood that the second portion 288 can have various suitable shapes for engaging a receiving means 290.

The second end 234 of the cage segment 230 defines the receiving means 290 which extends circumferentially from the second end 234. Preferably the receiving means 270 is integrally formed with the second end 234. The receiving means 290 defines a circumferentially extending portion 292 which defines an opening 294 having opposing inner surfaces 294A and 294B and opposing surfaces 294C and 294D. The opening 294 receives the second portion 284 of the engaging means 280. In the embodiment shown, at least one detent 296 and preferably a plurality of detents 296 extend circumferentially from the surfaces 294A, 294B, 294C and 294D of the opening 294. As best seen in FIG. 7, the extending portion 292 defines a first radially extending flange 293 and a second radially extending flange 295 which are in a spaced apart relationship and which define a further opening 297. The receiving means 280 is moved in a radial direction such that the second portion 288 snaps into the opening 294 and is held in retention therein by the detents 296. The first portion 282 can matingly be received by the flanges 293 and 295.

In the embodiment shown in FIG. 5–7, the engaging means 280 on the cage segment 230 and the receiving means 290 on the adjacent cage segment allow unidirectional radial assembly. To assemble the clutch 208 each assembled segment 230, having the spring 224 and the roller 226 positioned therein, is moved into position adjacent the cam race 210 by aligning the cam surfaces 246 and 247 of the segment 230 with an adjacent sloped cam ramp 220 of the cam race 210. The first cage segment 230 is moved in a radially inward direction toward an adjacent segment 230 as seen in FIG. 5, such that the engaging means 280 is moved radially into the opening 294 in the receiving means 290 in adjacent cage segment 230. That is, the engaging means 280 is radially moved toward the receiving means 290 until the engaging means 280 is in contact with (or snapped into) the receiving means 290. In such a manner, the cage segments can be automatically installed in a clutch or can be automatically assembled such that a plurality of cage segments can be snapped together and then installed in the annular space 220 between the races 210 and 212. When the first cage segment 230 is snapped into the adjacent segment 230 and is positioned adjacent a corresponding sloped cammed surface 220 of the cam race 210, the roller 224 moves in a direction toward the spring 226 such that the spring 226 is compressed.

The cage segment 230 is held in circumferential retention due to the contact between the second portion 288 of the engaging means 280 and the radially extending flanges 293 and 295 on the receiving means 290. The cage segment 230 is also held in circumferentially retention due to the contact between the camming surfaces 246 and 247 of the segment 230 against the sloped ramp 220 of the cam race 210.

The cage segment 230 is held in radial retention due to the contact of the camming surfaces 246 and 247 of the cage segment 230 against the sloped cam ramp 220 of the cam race 210 and due to the contact of the second portion 288 of the engaging means 280 with the detents 296 of the receiving means 290.

The cage segment 230 is held in axial retention due to the engagement of the ends 289A, 289B of the second portion 288 with the opposing ends of the opening 294 and to the contact between the first portion 282 with the ends of the radially extending flanges 293 and 295.

The cage segment 230 is also held in axial retention due to the engagement of the engaging means 244 with the cam race 210. The side walls 236 and 238 of segment 230 hold the spring 226 and roller 224 in axial retention.

The cage segments 230 are secured to the cam race 210 and the pathway race 212 to form the clutch 208.

It is to be understood that variations in the preferred embodiments can be made without departing from the intended scope of the present invention. For example, the shape configuration and the number of the engaging means on the cage segment can be altered.

I claim:

1. A cage segment for use in a clutch having a cam race and a pathway race, the cage segment comprising a first end and a second end which are in a spaced apart parallel relationship and a first side wall and a second side wall which are in a spaced apart parallel relationship, the first and second ends and first and second side walls defining an interior space for receiving at least one roller means and at least one resilient means, the first end defining at least one engaging means and the second end defining at least one receiving means, the engaging means of the cage segment securing the cage segment to the receiving means on an adjacent cage segment whereby the cage segment is secured to the adjacent cage segment in the radial, axial and circumferential directions;

the engaging means comprising at least one first portion which circumferentially extends outwardly from the first end of the cage segment toward the adjacent cage segment and at least one second portion operatively connected to the first portion of the engaging means, the first portion of the engaging means having an upper face and a lower face, the upper face circumferentially extending from the first end of the cage segment farther than the lower face such that the second portion of the engaging means is operatively connected to the first end at an angle to the first end, whereby the adjacent cage segment is positioned in closer proximity than if the upper face and the lower face of the first portion had the same length, and whereby the first and second portions of the engaging means matingly engage the receiving means on the adjacent cage segment.

2. The cage segment of claim 1, wherein the receiving means comprises at least one circumferentially extending flange member which secures the engaging means on the adjacent cage segment in radial, axial and circumferential retention.

3. The cage segment of claim 2, wherein the receiving means comprises at least one circumferentially extending upper flange member and at least one circumferentially extending lower flange member whereby the upper and lower flange members are moved in radially opposite directions as the engaging means on the cage segment is moved in an axial direction toward the receiving means on the adjacent cage segment.

4. The cage segment of claim 3, wherein the receiving means comprises at least one circumferentially extending flange member having at least one opening therein for receiving the engaging means on the adjacent cage segment; the engaging means on the adjacent cage segment being moved in a radial direction toward the opening in the receiving means to secure the adjacent cage segment to the cage segment.

5. The cage segment of claim 3, wherein the circumferentially extending upper flange member of the receiving means comprises a first portion which extends circumferentially from the second end of the cage segment and a second portion which depends or extends radially inwardly from the first portion of the upper flange member for contact with the engaging means.

6. The cage segment of claim 5, wherein the receiving means comprises at least two circumferentially extending lower flange members in a spaced apart relationship, each lower flange member having a first portion which extends circumferentially from the second end of the cage segment and a second portion which depends or extends in a radially outward direction from the first portion of the lower flange in a direction toward the upper flange member.

7. The cage segment of claim 3, wherein a second portion of the upper flange member has a planar surface having six sides, one axially extending upper side, one lower axially extending side, one inner radially extending side and one outer radially extending side; one angled side extending from the lower axially extending side to the inner side and one angled side extending from the axially extending lower side to the outer side.

8. The cage segment of claim 2, wherein the circumferentially extending flange member of the receiving means defines an opening defined by opposing inner surfaces and outer surfaces and, the opposing surfaces having a plurality of detents extending circumferentially from at least one of the surfaces of the opening.

9. The cage segment of claim 1, wherein the second portion of the engaging means has a generally square or rectangular shape.

10. The cage segment of claim 1, wherein the first portion of the engaging means has eight sides comprised of two axially extending sides, two radially extending sides and four angled sides, each angled side extending from one axially extended side to the adjacent radially extending side, and wherein the angled sides adjacent the lower axially extending side engages the receiving means on the adjacent cage segment.

11. The cage segment of claim 1, wherein the second portion of the engaging means has eight sides, one upper axially extending side and one lower axially extending side, one inner radially extending side and one outer radially extending side and four angled sides, each angled side extending from one axially extending side to the adjacent radially extending side.

12. The cage segment of claim 1, wherein the second portion of the engaging means has a substantially cylindrical shape.

13. The cage segment of claim 1, wherein the second end defines at least one upper flange which circumferentially extends inwardly in a direction toward the first end from a top portion of the second end, the second end further defining at least one lower flange which circumferentially extends inwardly in a direction toward the first end from a lower portion of the second end, wherein the upper flange and lower flange engage the resilient means.

14. The cage segment of claim 13, wherein the lower flange on the second end has a sloped surface for biasing one edge of the resilient means in a direction toward the upper flange on the second end.

15. The cage segment of claim 1, wherein the first end defines at least one upper flange which circumferentially extends inwardly in a direction toward the second end from a top portion of the first end, the first end further defining at least one lower flange which circumferentially extends inwardly in a direction toward the second end from a lower portion of the first end, wherein the upper flange and lower flange engage the roller means.

16. The cage segment of claim 15, wherein at least one of the upper flange and lower flange on the first end have sloped or wedged surfaces which matingly engage the longitudinal surface of the roller means.

17. The cage segment of claim 1, wherein the cage segment defines a retaining means for securing the cage segment in the axial direction.

18. A roller clutch having a plurality of the cage segments of claim 1 and a plurality of roller means located between the cam race and the pathway race, the cam and pathway races being substantially coaxial about a single axis extending in an axial direction and defining an annular space, the cam race defining a plurality of sloped cam ramp surfaces and the pathway race defining a cylindrical path in opposed relationship to the cam ramp surface, each of the roller means being engaged between the cylindrical path on the pathway race and an adjacent cam ramp surface on the cam race, the roller means moving in a circumferential direction in the annular space between the races during clutch operation; each cage segment having at least one camming surface for slideably engaging the cam ramp surface, the engaging means on each cage segment securing the cage segment to the receiving means on the adjacent cage segment, such that each cage segment is secured to the adjacent cage segment in radial, axial and circumferential directions and the secured cage segments form a substantially circular cage.

19. A method for securing a substantially circular cage comprising a plurality of connected cage segments in a clutch in the radial, axial and circumferential directions, the clutch having a pathway race and a cam race, the cam race defining a cam ramp surface, the method comprising the steps of:

providing a plurality of the cage segments of claim 1, each of the side walls of the cage segment including a camming surface for matingly engaging the cam ramp surface;

moving the engaging means of each cage segment into engagement with the receiving means of the adjacent cage segment to form the cage; and centering the camming surfaces of each cage segment adjacent a corresponding cam ramp surface of the cam race.

20. The method of claim 19, including the step of moving the engaging means of one cage segment in an axial direction toward the adjacent receiving means on the adjacent cage segment until the engaging means is secured to the adjacent receiving means in the radial, axial and circumferential directions.

21. The method of claim 19, including the step of moving the engaging means of one cage segment in a radial direction toward the adjacent receiving means on the adjacent cage segment until the engaging means is secured to the adjacent receiving means in the radial, axial and circumferential directions.

* * * * *